June 28, 1927.
C. B. HAWKINS
GRATER
Filed June 7, 1926
1,633,700
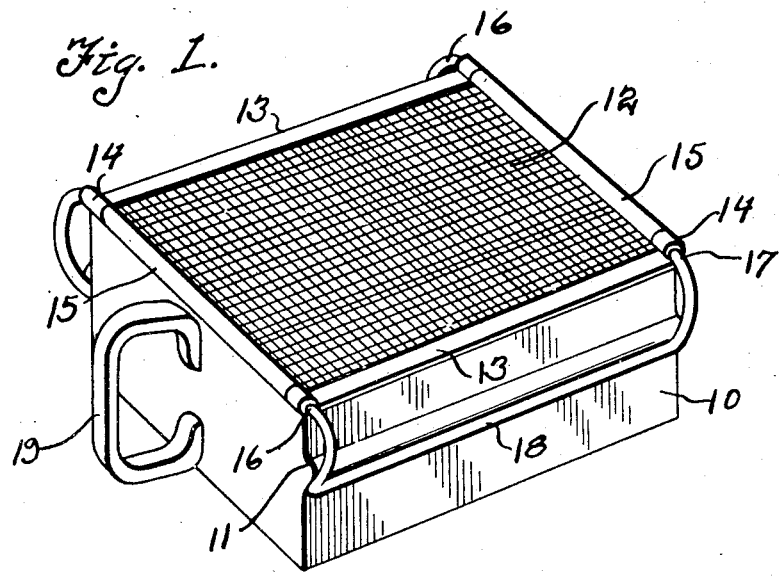
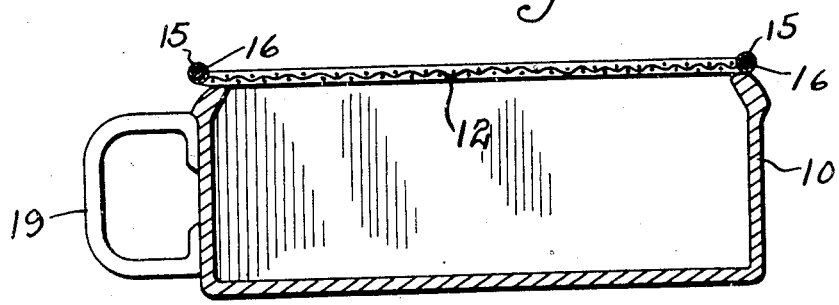
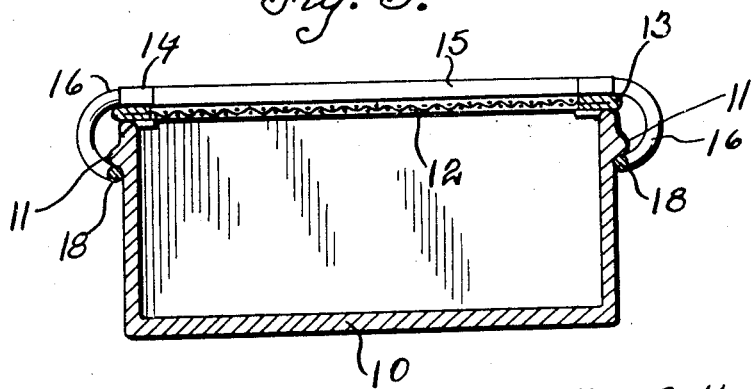
Charlotte B. Hawkins
INVENTOR
BY Victor J. Evans
ATTORNEY
WITNESS:

Patented June 28, 1927.

1,633,700

UNITED STATES PATENT OFFICE.

CHARLOTTE B. HAWKINS, OF PARKDALE, ARKANSAS.

GRATER.

Application filed June 7, 1926. Serial No. 114,339.

This invention comprehends the provision of a grater for domestic use, and primarily intended for grating soft foodstuffs, such as cheese, cake, chocolate, egg yokes and the like, and provides a structure which will not become clogged easily, and one which can be conveniently cleaned and maintained in a sanitary condition.

In carrying out the invention it is my purpose to provide a grate in the nature of a top for a suitable receptacle, the grate being provided with handles designed to cooperate with the body of the container for holding the grate fixed relatively thereto, the material falling through the grate into the container as will be readily understood.

Another object of the invention resides in the provision of a grate for the above mentioned purposes which is very simple in construction, so that it can be manufactured and sold at a nominal cost.

In the drawing forming part of this application like numerals of reference indicate similar parts in the several views and whereon:

Figure 1 is a perspective view of the invention.

Figure 2 is a longitudinal vertical sectional view therethrough.

Figure 3 is a transverse vertical sectional view.

Referring to the drawing in detail 10 indicates a receptacle which may be constructed from any suitable material and also vary in size and configuration without departing from the spirit of the invention. This receptacle is preferably provided at its opposite sides with longitudinally extending ribs or shoulders 11 for a purpose to be hereinafter described. The grate proper constitutes a closure or top for the receptacle and consists of a foraminated body portion 12, preferably wire mesh, the opposed longitudinal edges of which are bound by sheet metal 13. This metal at each side is folded upon itself and receives the adjacent edge of the foraminated body portion 12 as clearly illustrated in Figure 3. The ends of the metal binding strips terminate to provide rounded loops 14 which are arranged at the ends of hollow tubular binding strips 15 secured to the opposed ends of the foraminated body portion 12. The entire grate structure is reinforced by a wire frame-like structure including parallel portions 16 which are received by the tubular binding strips 15 and loops 14 respectively, extending beyond the opposed longitudinal edges of the grate and curved outwardly and downwardly to provide handles 18. The construction of these handles is such that when the grate is arranged upon the top of the receptacle or container 10, they engage the under side of the shoulder or rib 11 of the receptacle to hold the grate fixed relatively to the latter. The receptacle is also provided with a suitable handle 19 by means of which the entire device may be lifted and moved from place to place. The grate is particularly useful for the purposes above mentioned, and by reason of its construction does not become easily clogged and can be very conveniently cleaned and maintained in a sanitary condition.

While it is believed that from the foregoing description, the nature and advantages of the invention will be readily apparent, I desire to have it understood that I do not limit myself to what is herein shown and described and that such changes may be resorted to when desired as fall within the scope of what is claimed.

What is claimed is:

1. In combination, a receptacle, a grate constituting a closure therefor and comprising a foraminated body portion, metallic members binding the edges of said body portion, a reinforcing frame-like structure forming part of the grate and extended beyond the sides thereof to provide handles, and means carried by the receptacle and cooperating with said handles for holding the grate against displacement upon the receptacle.

2. In combination, a receptacle, shoulders formed on the opposed sides of the receptacle, a grate constituting a closure for the receptacle and comprising a foraminated body portion, a reinforcing frame forming part of the grate structure and extended beyond the sides thereof, and curved in the direction of the receptacle, said frame including handle portions adapted to engage said shoulders for holding the grate against displacement upon the receptacle.

3. As a new and improved article of manufacture, a grate comprising a foraminated body portion, metallic strips binding the two opposed edges of said body portion, tubular members secured to the other opposed edges of the body portion, loops formed at the ends of said strips and arranged in alignment with said tubular members, a reinforcing frame including parallel portions received by the tubular members and loops and extended beyond the sides of the grate, and handles forming part of said frame and connecting the parallel portions thereof.

In testimony whereof I affix my signature.

CHARLOTTE B. HAWKINS.